United States Patent [19]

Mahoney et al.

[11] Patent Number: 5,070,369
[45] Date of Patent: Dec. 3, 1991

[54] ELECTROSTATOGRAPHIC METHOD AND APPARATUS FOR PRODUCING MULTICOLOR DUPLEX REPRODUCTIONS

[75] Inventors: Gregory P. Mahoney, Fairport; Bruce R. Benwood, Churchville, both of N.Y.

[73] Assignee: Eastman Kodak Company, Rochester, N.Y.

[21] Appl. No.: 304,093

[22] Filed: Jan. 31, 1989

Related U.S. Application Data

[63] Continuation-in-part of Ser. No. 119,370, Nov. 10, 1987, abandoned.

[51] Int. Cl.$^5$ .............. G03G 15/01; G03G 15/14; G03G 21/00
[52] U.S. Cl. .................. 355/271; 355/319; 355/327
[58] Field of Search .............. 355/211, 212, 213, 313, 355/319, 327, 271

[56] References Cited

U.S. PATENT DOCUMENTS

| | | | |
|---|---|---|---|
| 3,672,765 | 6/1972 | Altmann | 355/319 X |
| 4,191,465 | 3/1980 | Boase et al. | 355/319 |
| 4,214,831 | 7/1980 | Reesen | 355/319 |
| 4,370,047 | 1/1983 | Damouth et al. | 355/327 |
| 4,477,176 | 10/1984 | Russel | 355/319 X |
| 4,515,460 | 5/1985 | Knechtel | 355/327 |
| 4,821,066 | 4/1989 | Foote et al. | 346/157 X |

Primary Examiner—Fred L. Braun
Attorney, Agent, or Firm—Leonard W. Treash, Jr.

[57] ABSTRACT

A series of single color toner images are formed on one or more image members and transferred in registry to an intermediate member to form multicolor images. A first multicolor image is transferred from the intermediate member to the first side of a copy sheet, the copy sheet is inverted and a second multicolor image is transferred to the second side of the copy sheet. Preferably, the first multicolor image is not fused prior to transfer of the second multicolor image to the copy sheet, and the two multicolor images are fused to the copy sheet simultaneously.

3 Claims, 3 Drawing Sheets

ELECTROSTATOGRAPHIC METHOD AND APPARATUS FOR PRODUCING MULTICOLOR DUPLEX REPRODUCTIONS

This is a continuation-in-part of our earlier filed U.S. patent application Ser. No. 119,370, filed on Nov. 10, 1987, now abandoned.

TECHNICAL FIELD

This invention relates to electrostatography and, more specifically, to a method and apparatus for producing multicolor toner images and for transferring them to opposite sides of the same copy sheet.

BACKGROUND ART

Present commercial copiers and printers which create duplex output generally fall into one of two categories. In a double pass system, images are transferred to one side of a series of copy sheets, those images are fused and the copy sheets are placed in a duplex tray. From the duplex tray they are refed to the transfer station to receive images for the other side of the copy sheet, these images also are fused and sent to an output hopper. See, for example, U.S. Pat. Nos. 3,630,607 and 4,099,150.

In a single pass system, the copy sheet is fed to a transfer station to receive an image on one side and then is turned over and fed back to either the same transfer station or a second transfer station to receive an image on the other side. U.S. Pat. No. 3,672,765 shows an early example of this approach in which two transfer stations and two fusers are used, the first image being fused before the copy sheet is turned over for feeding to the second transfer station. The second fuser is used to fuse the second image before the copy sheet goes to the output hopper.

The Kodak Ektaprint 250 copier introduced in 1982 provided a substantial advance in the single pass form of duplexing. In that copier a turnaround mechanism is positioned between the first and second transfer stations and a copy sheet transport mechanism is positioned after the second transfer station, neither of which disturbs either of the powder images, permitting fusing of both images simultaneously after the second transfer. This system has a number of advantages over the two-pass system. The paper path is considerably shorter, paper jam clearance is easier, access time to the first sheet is greatly reduced, and the order of imaging in automatic collation systems is more straight forward. This latter advantage is especially useful when the system is used as part of a non-impact printer because data fed to a printer is generally in page sequential order, an order which printers using a duplex tray cannot conveniently use. This system also eliminates significant disadvantages of systems in which the images are separately fused. That is, the two images in such latter system get different amounts of fusing and the second transfer system must operate with a warmed copy sheet which may result in image voids from wrinkles and the like. It also saves the expense of an additional fuser often used in such systems.

Present electrostatographic color systems create separate toner images of different color and transfer them in registry to a single copy sheet. The separate toner images can be created on the same or different electrophotosensitive members.

Examples of many disclosures showing creation of the separate toner images on different electrophotosensitive members are U.S. Pat. No. 4,120,577 and U.S. Pat. No. 4,162,843. In these references a sheet is fed past three or four electrophotosensitive members each with a different color toner image and the images are transferred in registry to the sheet.

U.S. Pat. No. 4,477,176 shows an adaptation of the single-pass duplexing structure to multicolor duplex reproduction. According to FIG. 3 of that patent, color separation images for two multicolor images are formed in order on a single electrophotosensitive web. A copy sheet is fed to first and second transfer rollers, each of which have means for holding the copy sheet through at least two revolutions bringing it into contact with consecutive images to receive them in registration. The first transfer drum is reversible for inverting the copy sheet after it has received two or more images in registry on one side. The copy sheet is then fed through a fuser, is tacked to the second transfer drum, receives images in registry on the other side, is fed then to a second fuser and ultimately to an output hopper.

U.S. Pat. Nos. 3,838,919; 4,515,460; 4,652,115; 4,712,906 and 4,714,939 are examples of the use of intermediate drums or webs to receive a plurality of toner images in registration from which webs or drums the registered toner images are transferred in one step to a receiving sheet. These devices have the advantage of more precise registration than devices in which a copy sheet must be held securely as it is circulated through transfer relation with the images. The latter reference shows a duplex version, one side of which can be multicolor, in which an intermediate web is used for the second side image.

DISCLOSURE OF THE INVENTION

It is the object of the invention to provide a method and apparatus for producing multicolor duplex reproductions in which the copy sheet is moved through a relatively short paper path and in which registration of the components of the multicolor images is easily achieved.

These and other objects are accomplished by a method which includes the steps of forming a plurality of electrostatic images; toning these images with toners of different colors, respectively; transferring, in registration, the toner images to an intermediate member to form a first multicolor toner image; transferring the first multicolor toner image to the first side of a copy sheet; repeating the first three steps to form a second multicolor toner image on said intermediate member; and transferring said second multicolor image to the second side of the copy sheet. Both multicolor images can be formed on the intermediate member before transferring either image, or the first multicolor image can be transferred before the second is formed on the intermediate member.

With this method the advantages of a short, uncomplicated paper path gained by use of a single pass duplexing mechanism can be combined with the advantages of precise registration readily obtained using an intermediate transfer member.

According to a preferred embodiment, the above-mentioned advantages of the Kodak Ektaprint 250 copier can be obtained by inverting the copy sheet carrying an unfused multicolor image between transfers; receiving the second multicolor image and transporting the copy sheet to the fuser for simultaneous fusing of both images.

The multicolor images can be formed by transfer to the intermediate from a single image forming member or from a plurality of image forming members.

BEST MODE OF CARRYING OUT THE INVENTION

Figure 1:
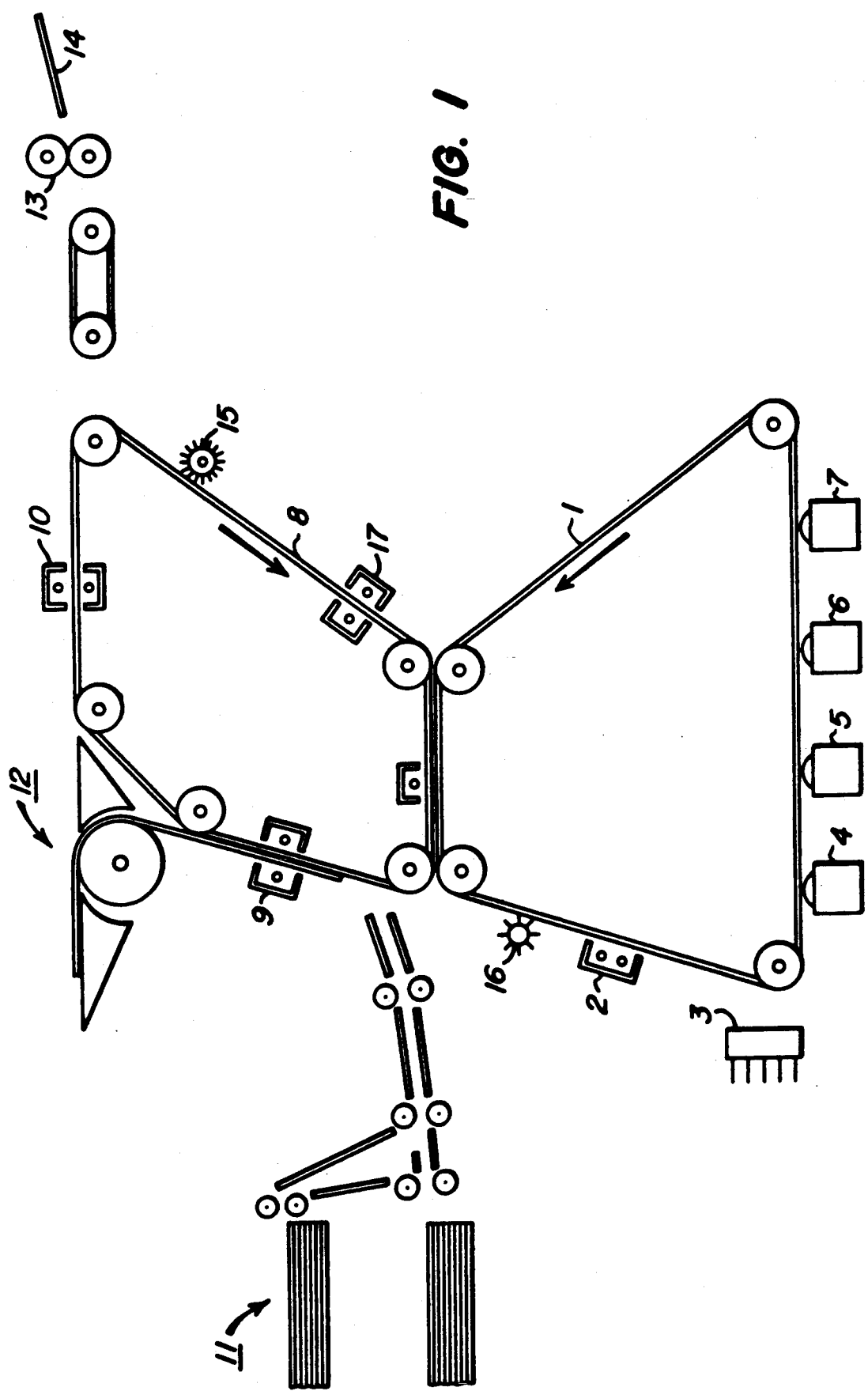
FIGS. 1 and 2 are schematic side views of alternative apparatus for carrying out the invention.

According to the FIG. 1, an insulating member, for example, electrophotosensitive belt 1 which may be of a typical electrophotographic type is used to create toner images of different color by procedures well known in the art. As shown, the belt 1 is uniformly charged at a charging station 2 and exposed at an exposing station 3 providing a series of electrostatic images. The electrostatic images are each toned by one of four toning stations 4, 5, 6 and 7, each of which contains toner of a desired color. These images make up the color components of two multicolor images to be produced. The electrophotosensitive belt then passes into transfer relation with an intermediate member 8 which is moving at the same speed as the electrophotosensitive belt 1 at the point or points of contact of the two members.

The images formed on the electrophotosensitive belt 1 are transferred in registration to the intermediate member creating first and second multicolor images.

Intermediate member 8 is also an endless belt mounted on a series of rollers and driven through a path bringing it into operative relationship with a first transfer station 9 and a second transfer station 10. Copy sheets stored in a copy sheet supply 11 are fed in a known manner to first transfer station 9 for receipt of a first multicolor image on a first side thereof. Copy sheets are fed from first transfer station 9 to a turnaround drum 12 which inverts the copy sheets without touching the, as yet unfused, multicolor toner image on the first side and feeds the copy sheet into transfer relation with the intermediate member 8 at the second transfer station 10. A second multicolor toner image is transferred to the second side of the copy sheet at the second transfer station 10. The copy sheet is then fed to a duplex fuser 13 and then into an output hopper 14.

Control and feeding of the copy sheet from the first transfer station 9 through the fuser 13 must be done with care not to disturb unfused toner images. More details of apparatus for such feeding and control is shown and described more completely in U.S. Pat. No. 4,095,979, issued June 20, 1978, to DiFrancesco et al, which patent is incorporated by reference herein.

The electrophotosensitive belt is cleaned at cleaning station 16 between images. The intermediate member 8 may also be cleaned by appropriate means 15. The transfer stations 9 and 10 include corona chargers of opposite polarity on opposite sides of member 8, urging the toner from the intermediate member 8 to the copy sheet. An initialization station 17 includes opposing AC chargers for eliminating charge on the intermediate member 8 before repeating the process.

The surface of intermediate member 8 can be made of any material that will receive a toner image and release it to a receiving sheet. For example, a plain polyester or urethane coated material can be used. The member 8 may be either an endless web or a drum, although the endless web configuration is better able to accomodate the paper path shown in FIG. 1.

Although conventional corona transfer devices are shown, other well known methods of transfer could be used, for example, roller or thermal transfer.

The exposure station 3 is shown as an electronic print head. It, of course, may be an ordinary optical exposing station. However, single-pass duplexing is particularly useful with electronic origin images because the order of images received in a printer fits the order of images handled by the transfer apparatus in that system.

The electrostatic images need not be created electrophotographically. For example, they may be formed electrographically by an ion projection mechanism on an ordinary, not photosensitive, insulating surface.

Intermediate member 8 can be equal in length to the length of a single image frame, or multiples thereof. For example, it can be equal in length to 17 inches plus an interframe to enable the apparatus to produce $11 \times 17$ images. If a belt accommodating this size is used and images having a width equal to 8½ inches are formed in some applications, then there is room on the intermediate member to receive two 8½ inch wide images placed with the 8½ inch dimension running longitudinally of the two webs. With this arrangement, two multicolor images would be carried on intermediate web 8 at one time. Thus, in a four color system, using 8½ inch wide copy sheets, the order of images on the electrophotosensitive member 1 can be Cyan No. 1, Cyan No. 2, Magenta No. 1, Magenta No. 2, Yellow No. 1, Yellow No. 2, Black No. 1 and Black No. 2. Two-multicolor images would then appear on consecutive half portions of the intermediate member as it reaches the first and second transfer stations 9 and 10, respectively. In the $11 \times 17$ mode, only one multicolor image is formed at a time on the web 8. The first multicolor image is transferred to the copy sheet, and the copy sheet waits at turnaround drum 12 while the intermediate web makes four revolutions to form the second multicolor image. At that time, the transfer sheet is fed to the second transfer station to receive it. See U.S. Pat. No. 4,712,906, Bothner et al, for a similar sequence in a simplex mode.

Thus, the intermediate member 8 can be one frame in size, in which case the copy sheet is delayed at turnaround drum 12; the intermediate member can be two or more images in length, in which case the copy sheet is returned immediately to transfer station 10 from the turnaround drum; or, it can operate sometimes in one mode and sometimes in the other, as described above.

Either or both of the webs 1 and 8 can be drums, although copy sheet separation is easier to accomplish without disturbing unfused images if at least the intermediate is a belt.

If simplex copies are to be made with this apparatus, the copy sheets can be fed directly to the second transfer station 10 by means not shown.

Figure 2:
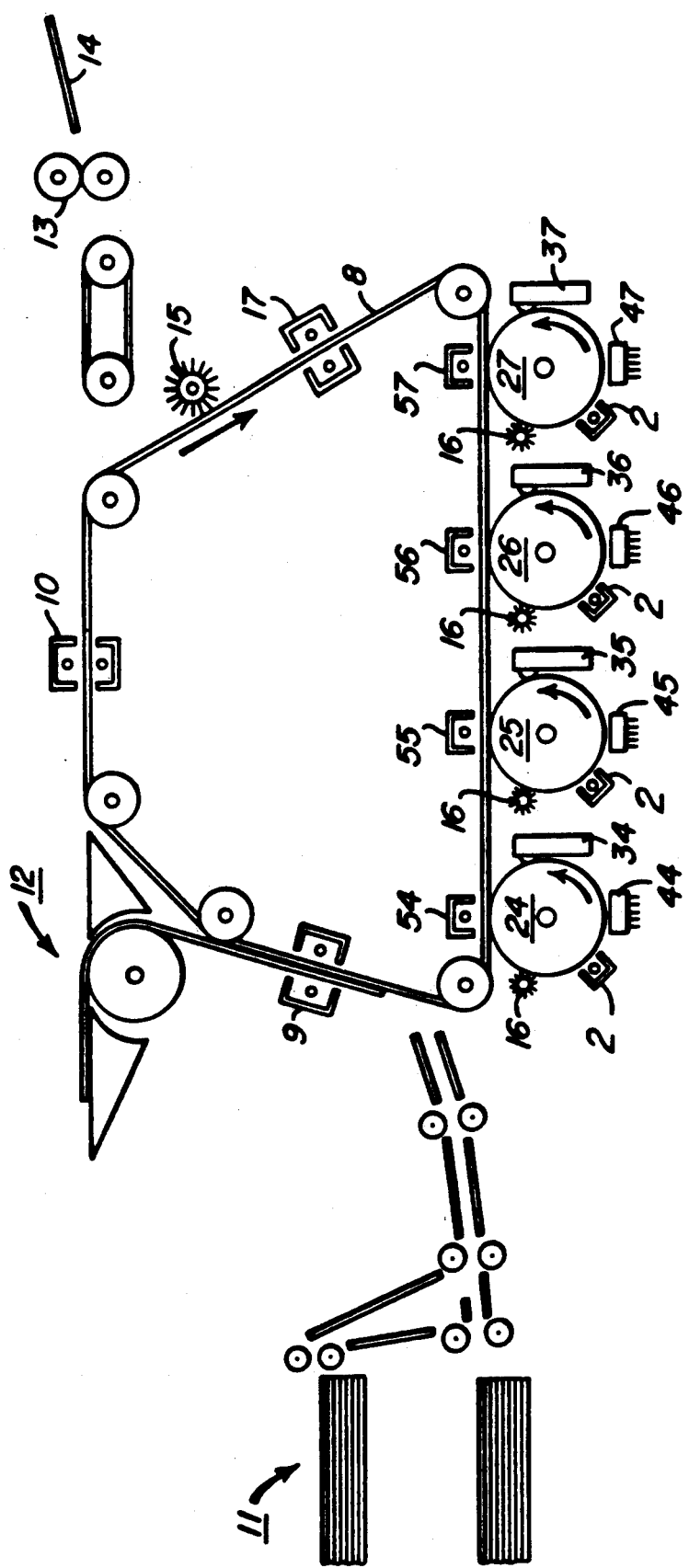

An alternative approach to forming the monocolor images transferred to web 8 to form the multicolored images is shown in FIG. 2. Web 1 is replaced by four separate image forming members 24, 25, 26 and 27 which function in parallel. As shown, members 24-27 can be photoconductive drums each separately charged by chargers 2 and exposed by LED printheads 44, 45, 46, and 47 to color separation images to form electrostatic images representing the color components of a multicolor image to be printed. The electrostatic images are toned by toner stations 34, 35, 36 and 37, each containing the appropriate color toner for the electrostatic image on its drum. The toner images are then transferred in registry to intermediate web 8 to form multicolor images similar to those formed by the FIG. 1 apparatus.

Unlike the FIG. 1 apparatus the web 8 in FIG. 2 need not make a full revolution for each color. Thus, it need not be equal to any particular multiple of the image pitch, and can in fact be smaller (or larger) in size than the image pitch. It has the advantage of producing multicolor images four times as fast as the FIG. 1 apparatus, but requires four images forming members. The imaging members 24-27 could also be four endless webs, each similar to web 1 in FIG. 1.

Like the FIG. 1 apparatus images can be formed by the imaging members by means other than electrophotographically, for example, by imagewise charge deposition. The images also could be formed by xeroprinting, or the like, using masters placed around drums, which masters (and drums) are large enough to carry both first and second electrostatic images.

Figure 3:
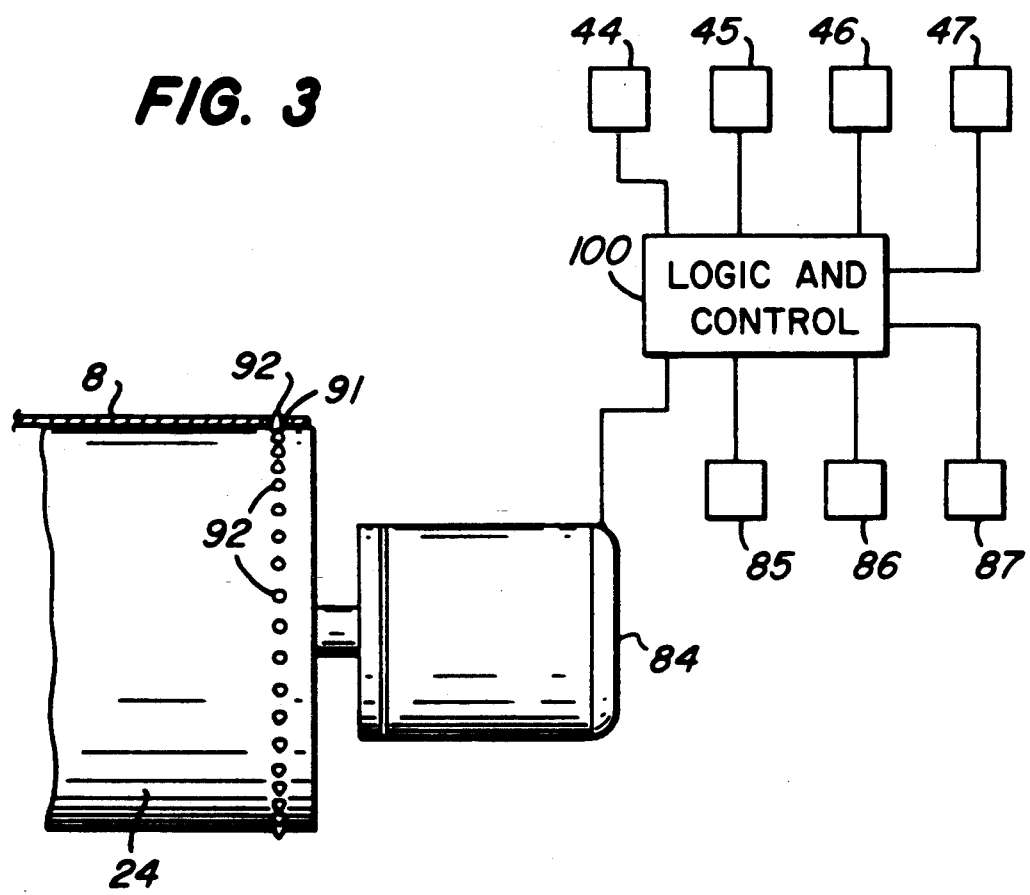
FIG. 3 is a front, partly schematic view of a portion of the apparatus shown in FIG. 2.

Depending upon the type and quality of multicolor image being formed, registration of images to at least moderate quality is within the skill of the art for both FIG. 1 and FIG. 2 embodiments. FIG. 3 illustrates schematically a registration approach for the FIG. 2 embodiment that gives high quality superposition of separate images from image forming members 24-27.

According to FIG. 3, imaging member 24 is a drum which has an integral sprocket 92 which fits in perforations 91 in member 8. The teeth of sprocket 92 can be driven to the front or rear edge of the perforations by a tendency drive on drum 24 or either the member 8 or drum 24 can drive the other thereby forcing the teeth against an edge of the perforation.

An encoder 84 monitors the angular position of drum 24 and therefore sprocket 92. Signals indicative of that angular position are fed to a logic and control 100. Logic and control 100 controls exposure station 44 to position the electrostatic image at a predetermined position with respect to sprocket 92. This can be done by controlling the start of scan if exposure station 44 is a laser or an optical scanning device or by controlling the flashing of each line if station 44 includes an LED printhead. Encoders 85, 86 and 87 are similarly connected to members 25, 26 and 27 and logic and control 100 to control exposure stations 45, 46 and 47, respectively. Logic and control 100 is adjusted to locate comparable points in each image at the same position relative to a predetermined sprocket tooth for each of members 24-27. The only mechanical requirement then is the predetermined tooth in each sprocket engage the same edge of the same perforation. With this timing approach, errors in perforation location are compensated for and fine tuning is easily accomplished by adjusting exposure timing relative to encoder signals. The use of sprockets and perforations for color image registration is also disclosed in U.S. patent application Ser. No. 158,953, filed Feb. 22, 1988, now U.S. Pat. No. 4,821,066 Foote et al, entitled NONIMPACT PRINTER, which shows a device that could readily be adapted to the FIG. 1 embodiment of this invention.

The invention has been described in detail with particular reference to a preferred embodiment thereof, but it will be understood that variations and modifications can be effected within the spirit and scope of the invention as described hereinabove and as defined in the appended claims.

We claim:

1. A method of producing multicolor duplex reproductions comprising:
   forming a plurality of electrostatic images, alternate images defining single color components of first and second multicolor images, respectively;
   toning said electrostatic images with toners, which toners are of different color for the electrostatic images corresponding to each multicolor image;
   transferring in registration the toner images intended for the first and second multicolor images to first and second portions of an intermediate member, respectively, to form first and second multicolor toner images; and
   then transferring said first multicolor toner image to a first side of a copy sheet, and said second multicolor toner image to a second side of said copy sheet.

2. A method of producing multicolor duplex reproductions comprising:
   forming a plurality of electrostatic images on a single insulating member, alternate images defining color components of first and second multicolor images, respectively;
   toning said electrostatic images with toners which are different for the electrostatic images corresponding to each multicolor image;
   transferring in registration the toner images intended for the first and second multicolor images to first and second portions of an intermediate member, respectively, to form first and second multicolor toner images;
   then transferring said first multicolor toner image to a first side of a copy sheet, and transferring said second multicolor toner image to a second side of said copy sheet while said first toner image remains unfixed on the first side; and
   simultaneously fixing said first and second toner images to the copy sheet.

3. Apparatus for creating and superimposing images comprising:
   a plurality of image forming members, each member having an image receiving surface,
   means for forming a toner image on each image receiving surface;
   means for supporting a moving web in transfer relation with said image forming members, said web having a plurality of perforations along an edge;
   a sprocket associated with each image forming member and rotatable in timed relation with movement of each image receiving surface and having teeth engageable with said perforations, corresponding sprocket teeth of the respective sprockets engaging the same perforation;
   means for sensing the angular position of each sprocket; and
   logic and control means for controlling the formation of the respective toner images in response to the angular position of the respective sprockets to position the toner images on their respective image receiving surfaces at the same location relative to the corresponding teeth of each respective sprocket to assure transfer of the toner images in registration onto the moving web.

* * * * *